(12) United States Patent
Newstadt et al.

(10) Patent No.: US 9,788,153 B1
(45) Date of Patent: Oct. 10, 2017

(54) TECHNIQUES FOR MOBILE GEOFENCING (71) Applicant: Symantec Corporation, Mountain View, CA (US)

(72) Inventors: Keith Newstadt, West Newton, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 58 days.

(21) Appl. No.: 14/228,489

(22) Filed: Mar. 28, 2014

(51) Int. Cl.
*H04W 4/02* (2009.01)

(52) U.S. Cl.
CPC .................... *H04W 4/021* (2013.01)

(58) Field of Classification Search
CPC ..... H04W 4/021; H04W 4/022; H04W 4/023; H04W 4/025; H04W 4/04; H04W 4/02; H04W 8/14; H04W 8/08; H04W 48/04; H04W 64/00; H04W 68/00; H04W 68/12; H04W 40/24; H04W 40/244; H04W 4/027; H04W 4/028; H04W 48/00; G01C 21/00; G01C 21/28; H04L 67/22; H04L 9/0872
See application file for complete search history.

(56) References Cited

U.S. PATENT DOCUMENTS

| | | | |
|---|---|---|---|
| 7,576,754 B1 * | 8/2009 | Joseph et al. ................. 345/619 |
| 7,848,765 B2 * | 12/2010 | Phillips et al. ............ 455/456.3 |
| 8,154,401 B1 * | 4/2012 | Bertagna et al. ........ 340/539.13 |
| 8,928,483 B2 * | 1/2015 | Nasir et al. ................. 340/573.4 |
| 8,971,930 B2 * | 3/2015 | Li et al. ...................... 455/456.3 |
| 2008/0094230 A1 * | 4/2008 | Mock ........................ G08B 1/08  340/573.4 |
| 2009/0075677 A1 * | 3/2009 | Seger .................. G08B 21/0261  455/456.6 |
| 2012/0052870 A1 * | 3/2012 | Habicher .................... 455/456.1 |
| 2012/0268269 A1 * | 10/2012 | Doyle ................ G08B 21/0202  340/539.13 |
| 2012/0284769 A1 * | 11/2012 | Dixon ..................... H04W 4/20  726/1 |
| 2012/0295637 A1 * | 11/2012 | Hannuksela .......... G01S 3/8034  455/456.1 |
| 2013/0031029 A1 * | 1/2013 | Davidson ............... G07B 15/06  705/412 |
| 2014/0288820 A1 * | 9/2014 | Opshaug ................ G01C 21/30  701/412 |

* cited by examiner

*Primary Examiner* — Meless Zewdu
(74) *Attorney, Agent, or Firm* — Wilmer Cutler Pickering Hale and Dorr LLP (57) ABSTRACT

Techniques for mobile geofencing may be realized as a method including: receiving geofence parameters comprising at least one target, wherein the at least one target includes a mobile target; receiving updated position data associated with the mobile target and updating the position of the mobile target in response to the updated position data; monitoring a position of a client device; and determining that the monitored position of the client device transgresses the geofence parameters, wherein the determination includes determining that a distance between the updated position of the mobile target and the monitored position of the client device is greater than a first threshold distance.

22 Claims, 4 Drawing Sheets

TECHNIQUES FOR MOBILE GEOFENCING

FIELD OF THE DISCLOSURE

The present disclosure relates generally to location tracking, and, more specifically, to techniques for mobile geofencing.

BACKGROUND OF THE DISCLOSURE

Geofencing allows an administrator to define an area that a user is not allowed to leave. For example, a parent may say that their child should only be at home, school, or somewhere in between. An employer may say that their truck drivers should only be on their delivery routes. If the geofencing policy is violated, then the administrator is alerted.

However, real world scenarios are rarely this static. For example, a child may leave home in the company of his or her parent, on the public school bus, or on a specific city bus that takes them to a relative's house. This makes for a poor user experience, as a parent gets notifications and perhaps disables geofencing policy whenever they are out and about with their child. It also lowers security, as the child should continue to be tracked and alerted on if they wonder (or are taken) outside of the parent's vicinity.

In view of the foregoing, it may be understood that there may be significant problems and shortcomings associated with current geofencing technologies.

SUMMARY OF THE DISCLOSURE

Techniques for mobile geofencing are disclosed. In one embodiment, the techniques may be realized as a method comprising the steps of receiving geofence parameters comprising at least one target, wherein the at least one target includes a mobile target; receiving updated position data associated with the mobile target and updating the position of the mobile target in response to the updated position data; monitoring a position of a client device; and determining that the monitored position of the client device transgresses the geofence parameters, wherein the determination includes determining that a distance between the updated position of the mobile target and the monitored position of the client device is greater than a first threshold distance.

In accordance with other aspects of this embodiment, the method may further comprise generating a notification in response to determining that the monitored position transgresses the geofence parameters.

In accordance with other aspects of this embodiment, the at least one target may be a plurality of targets, the plurality of targets further including a stationary geographic position. Determining that the monitored position transgresses the geofence parameters may further include determining that a distance between the stationary geographic position and the monitored position is greater than a second threshold distance.

In accordance with further aspects of this embodiment, the first threshold distance may be the same as the second threshold distance.

In accordance with further aspects of this embodiment, in response to determining that the distance between the stationary geographic position and the monitored position is greater than a second threshold distance, the method may further include requesting updated position data associated with the mobile target. The updated position data may be received after requesting updated position data.

In accordance with other aspects of this embodiment, the geofence parameters may include one or more stationary geofence parameters. Determining the distance between the updated position of the mobile target and the monitored position of the client device may occur in response to determining that the monitored position transgresses the one or more stationary geofence parameters.

In accordance with other aspects of this embodiment, the first threshold distance may be a user-predetermined setting.

In accordance with other aspects of this embodiment, the geofence parameters may further include a stationary geographic border. Determining that the monitored position transgresses the geofence parameters may further includes determining that the monitored position transgresses the stationary geographic border.

In accordance with further aspects of this embodiment, the method may further include, in response to determining that the monitored position transgresses the stationary geographic border, requesting updated position data associated with the mobile target. The updated position data may be received after requesting updated position data.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

The present disclosure relates to improving usability and security of existing geofencing solutions by allowing an administrator to define dynamic geofences around people and other moving objects.

When defining the geofence, the administrator can identify mobile points of reference such as people and vehicles that are equipped with geographic location tracking such as (but not limited to) GPS, mobile phone tracking, radar, etc. The administrator can then define radiuses around these reference points within which the monitored user (e.g. the child) can be considered within the geofence. This allows, for example, a parent to send his or her child to a city bus stop and only be notified if the child does not get off on the expected stop (as many cities now equip public buses with trackable GPS). It also allows the parent to accompany the child outside of the static geofence without alerts or disabling tracking, and still get alerts if the child wanders off or is taken.

The present disclosure includes optionally using new or existing social networks to improve usability of configuring dynamic geofences. Users can identify a Facebook friend as a safe mobile point of reference. The present disclosure also includes optionally using a third party source of GPS such as Glympse. Users can also identify online event scheduling resources as a way to automatically adjust the geofence to account for one-time or recurring events—for example, the parent could pre-authorize events listed in their child's school's Facebook profile or Google calendar in order to automatically adjust the geofence to include school buses and museums as appropriate.

Figure 1:
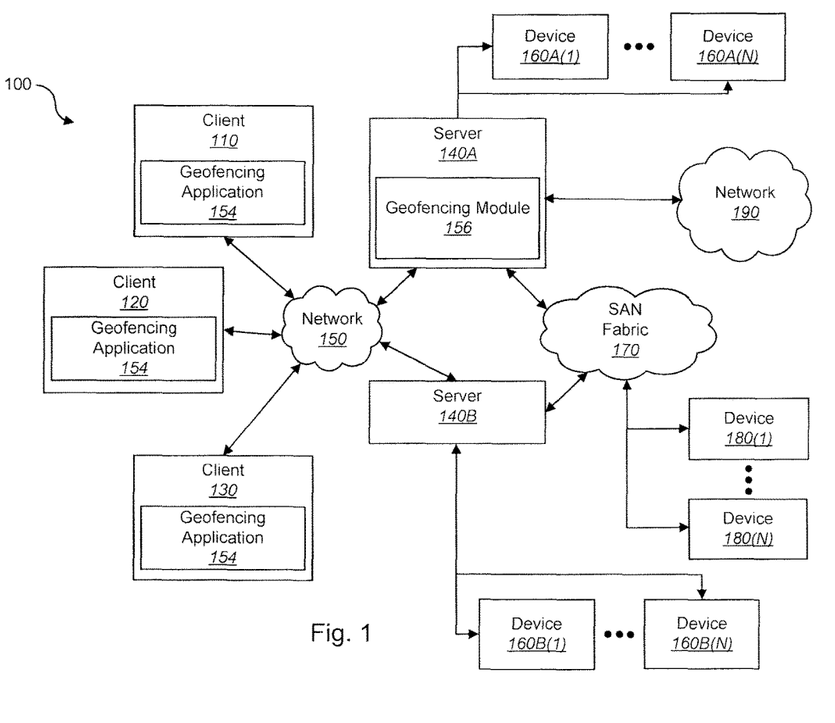
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
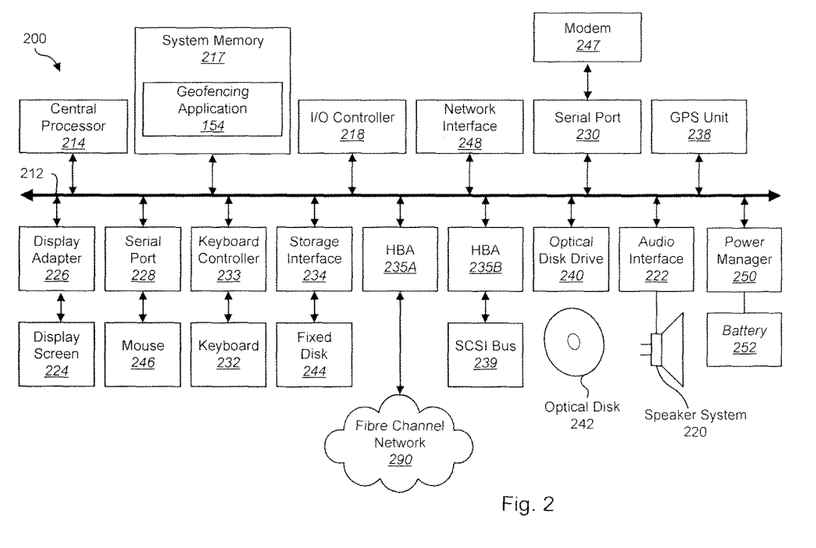
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of geofencing processes such as, for example, geofencing application 154, while server 140A may include one or more portions such as, for example, geofencing module 156. Further, one or more portions of the geofencing module 156 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including geofencing module 156 may be implemented as part of a cloud computing environment.

FIG. 2 shows a block diagram of a computer system 200 in accordance with an embodiment of the present disclosure. Computer system 200 is suitable for implementing techniques in accordance with an embodiment of the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit (not shown), a removable disk unit (e.g., Universal Serial Bus drive), or other storage medium. According to some embodiments, geofencing application 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like. GPS unit 238 may receive position information, such as the standardized signals sent by the global positioning system, and may be configured to provide position information based on the received signals.

Many other devices or subsystems (not shown) may be connected in a similar manner (e.g., document scanners, digital cameras and so on). Conversely, all of the devices shown in FIG. 2 need not be present to implement an embodiment of the present disclosure. The devices and subsystems can be interconnected in different ways from that shown in FIG. 2. Code to implement an embodiment of the present disclosure may be stored in computer-readable storage media such as one or more of system memory 217, fixed disk 244, optical disk 242, or floppy disk (not shown). Code to implement an embodiment of the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
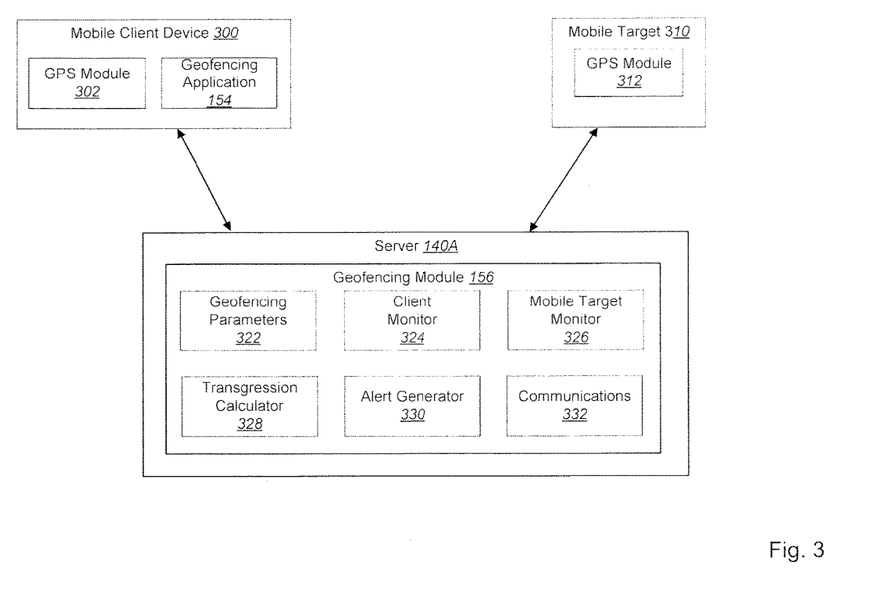
FIG. 3 shows a block diagram of a mobile client device, mobile target, and monitoring server in accordance with an embodiment of the present disclosure.

In one embodiment, a client system 110 may be a mobile device 300 as illustrated in FIG. 3. The mobile client device 300 may include a GPS module 302 that monitors received global positioning signals and uses those signals to determine a position for the client device 300. In some implementations, the GPS module 302 may further control a GPS receiver unit and other units associated with receiving and signaling position. Once the GPS receiver unit determines position information, the information may then be relayed to other applications for further use in navigation and tracking, such as a geofencing application 154.

The geofencing application 154 may communicate with the geofencing module 156 of a server 104A. The application 154 may report position information to the module 156 at regular intervals, or in response to certain events determined at the client device 300, or in response to a request for position information from the module 156. In some implementations, the geofencing application 154 may not be a standalone application, but instead may be a feature of another application, of an operating system, of a module such as the GPS module, or the like.

The geofencing module 156 may include geofencing parameters 322, which specify where the mobile client device 300 is permitted to be. The geofencing parameters may include, for example, one or more stationary positions and an allowed distance from each of those stationary positions; the allowed distances may be the same or may be different. The geofencing parameters may include, for example, one or more borders and a side of each border that the client device is permitted to be on. These stationary parameters may further include one or more navigation routes, which may represent an allowed region between two stationary positions such that the client device is permitted to be within a set distance of either stationary position or along the route between the stationary positions. Other settings, options, and configurations for stationary geofencing are known in the art.

In addition to the stationary geofencing parameters, the geofencing parameters 322 further include one or more mobile targets, represented by the mobile target 310. A distance may be associated with each mobile target 310, such that the client device 300 is in a permitted location as long as it is within the associated distance of a mobile target 310. Each mobile target distance may be the same or different and may be the same as or different than distances associated with the stationary targets. Mobile target 310 may be any target with variable position information, such as a client device, private vehicle, or public transit. The mobile target 310 may have a GPS module 312 or may have position information that is tracked in another fashion.

The geofencing module 156 may include a client monitor 324, which monitors the position and status of the client device 300 in accordance with the geofencing parameters 324. The client monitor 324 may communicate with a geofencing application 154 on the client device 300, may otherwise communicate with the client device 300, or may retrieve information about the client device 300 indirectly, such as from another system in network communication with the client device 300. In some implementations, the client monitor 324 may receive information from a service network providing telephone or data service to the client device 300. The device information monitored may include position information but also device status, such as the level of battery charge, whether the device is in a special operating mode such as "hands-free" or "airplane," and whether the device is connected to a wireless network.

The geofencing module 156 may include a mobile target monitor 326, which may include any of the features of the client monitor 324 in order to determine position and other status information for the mobile target 310. The mobile target monitor 326 may receive information from the mobile target 310 indicating the target's current position, or may receive information from a third party. In some implementations, the mobile target monitor 326 may receive information from a public transit system regarding the position of a mobile target 310 that is a transit vehicle.

In some implementations, the mobile target monitor 326 may not be as active as the client monitor 324. For instance, the client monitor 324 may monitor a client device 300 at regular intervals, while in some implementations the position of the mobile target 310 may only be queried and monitored when the device 300 is otherwise outside of the stationary geofencing parameters 300. In some implementations, position data may be sent regularly to the client monitor 324 but may only be sent to the mobile target monitor 326 when explicitly requested.

The geofencing module 156 may further include a transgression calculator 328 which compares the position of the client device 300 with the geofencing parameters 322 to determine if the client device 300 has transgressed the geofence. In some implementations, the transgression calculator 328 may first evaluate the position of the client device 300 against the stationary geofencing parameters, and only query the mobile target monitor 326 for the geofencing parameters associated with the mobile target or targets if the mobile device 300 is outside the stationary parameters.

The geofencing module 156 may further include an alert generator 330, which may generate a notification event, an alarm, or other alert in response to a transgression of the client device 300 as determined by the transgression calculator 328. In some implementations, a communications module 332 may be used to provide an alert, which in some implementations may include a message such as an email or SMS message. A push or other application notification may also be sent as an alert.

Figure 4:
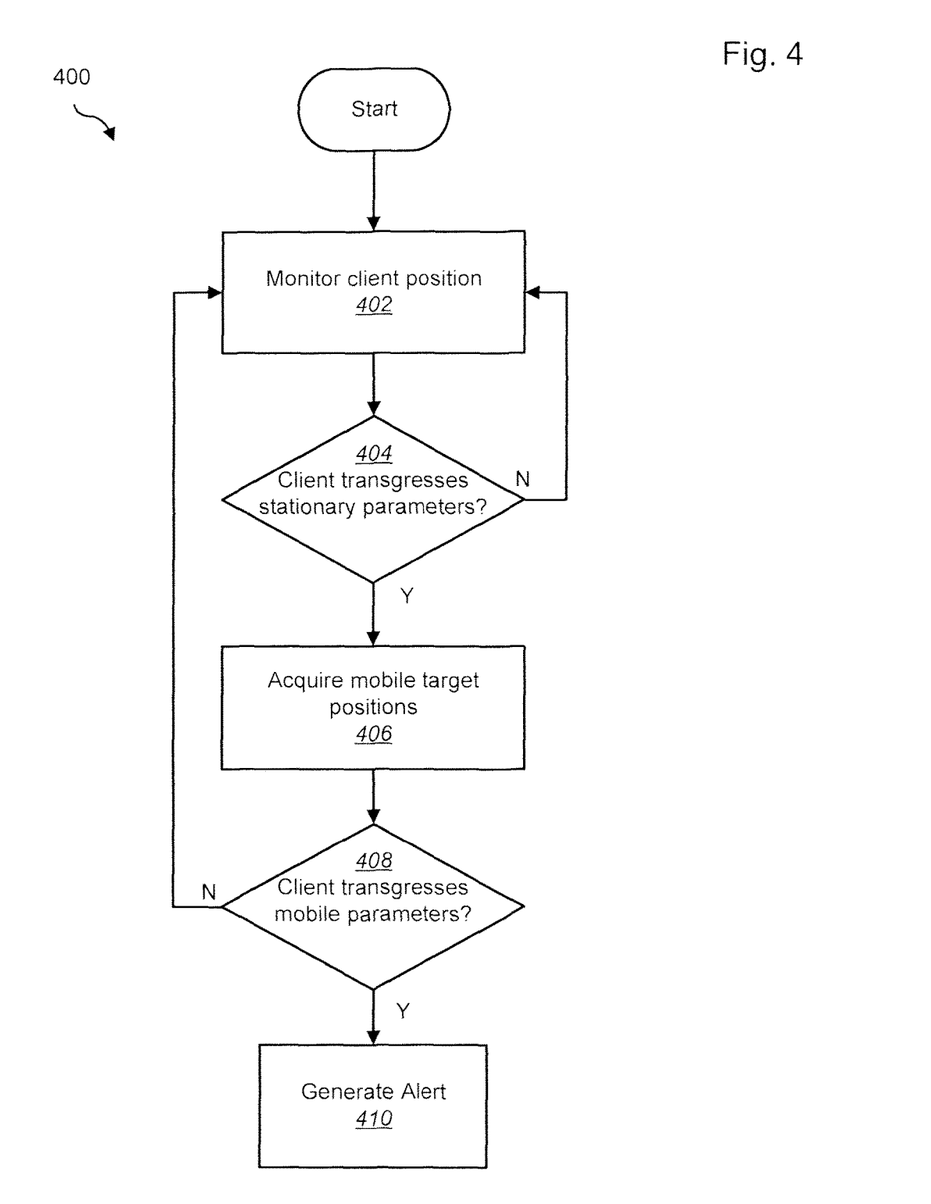
FIG. 4 shows a method for geofencing in accordance with an embodiment of the present disclosure.

FIG. 4 illustrates a method 400 for geofencing. The system monitors the position of a mobile client (402). The system may receive data from the mobile client reflecting a position, such as GPS data from an on-board GPS unit; the system may also receive data from other systems, such as communications systems providing network connectivity to the mobile client. In some implementations, the system may request data from the mobile client; alternatively, the mobile client may send position data to the system at a particular interval or in response to a particular event.

The system determines whether the position of the client satisfies the constraints of the stationary parameters or transgresses them (404). It will be noted that the position of the mobile client is not always precisely determinable; in some implementations, an imprecise range may be determined for the client position and the system may have to determine whether to consider the client to be transgressing the parameters based on ambiguity in the client location. The system may, in some implementations, determine a probability distribution for the position of the mobile device based on the reported error and a record of the client's previous positions, and consider the client to have transgressed only if a probability of a transgressing location exceeds a threshold value. The constraints of the stationary parameters may also represent geofencing parameters known in the art; that is, one of ordinary skill may recognize stationary geofencing and how to determine transgression. Other techniques to deal with ambiguous location in stationary geofencing are also known in the art. If the mobile client is considered to be within the stationary geofencing parameters, the system continues to monitor the client position.

According to the method 400 of FIG. 4, which is only one possible method to implement a process in accordance with an embodiment of the present disclosure, if the client is found to have transgressed the stationary parameters, the positions of the mobile targets are acquired (406). Ambiguous or imprecise locations are also possible for each of the mobile targets; in some implementations, a history of mobile target positions may be maintained and range of allowed positions may be implemented based on imprecise locations. Particular mobile targets whose positions are not reported at all in response to a system query may not be included in the analysis.

The positions of the mobile targets are then compared to the position of the mobile client to determine if the mobile parameters are also transgressed (408). Where both the mobile client and a particular mobile target include an uncertainty and a potential area of location, an overlap area may be calculated and compared against a threshold overlap to determine whether the mobile client should be considered within proximity of the mobile target. If the mobile client is within the specified distance of any of the mobile targets, then the mobile system returns to monitoring the client position.

If the client device is found to transgress the mobile parameters as well, then the system may generate an alert (410). The alert may be any message or communication designed to identify that a transgression event has occurred. In some implementations, the alert may be given to a third party such a monitoring service or to the authorities. The alert may include a notification to the client device, such as an application notification or SMS message. Alternatively, the client device itself may not be included in the alert.

In some implementations, the generation of an alert may temporarily stop the geofencing process, although some monitoring of the mobile client device may continue. In some implementations, further monitoring (including additional alerts) may be possible after a set interval.

At this point it should be noted that geofencing in accordance with the present disclosure as described above may involve the processing of input data and the generation of output data to some extent. This input data processing and output data generation may be implemented in hardware or software. For example, specific electronic components may be employed in a mobile device or similar or related circuitry for implementing the functions associated with geofencing in accordance with the present disclosure as described above. Alternatively, one or more processors operating in accordance with instructions may implement the functions associated with geofencing in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been presented herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
    receiving geofence parameters comprising at least one target, wherein the at least one target includes a mobile target;
    receiving updated position data associated with the mobile target and updating the position of the mobile target in response to the updated position data;
    monitoring a position of a client device, the client device being separate from the mobile target; and
    determining that the monitored position of the client device transgresses the geofence parameters associated with the mobile target, wherein the monitored position of the client device is based on a range of imprecise locations, wherein the determination includes determining that a distance between the updated position of the mobile target and the monitored position of the client device is greater than a first threshold distance, wherein the determination of transgression is based on a probability distribution of the position of the client device based on a reported error and a previous position of the client device.

2. The method of claim 1, further comprising:
    generating a notification in response to determining that the monitored position transgresses the geofence parameters.

3. The method of claim 1,
    wherein the at least one target is a plurality of targets, the plurality of targets further including a stationary geographic position; and
    wherein determining that the monitored position transgresses the geofence parameters further includes determining that a distance between the stationary geographic position and the monitored position is greater than a second threshold distance.

4. The method of claim 3, wherein the first threshold distance is the same as the second threshold distance.

5. The method of claim 3,
    wherein the method further comprises, in response to determining that the distance between the stationary geographic position and the monitored position is greater than a second threshold distance, requesting updated position data associated with the mobile target; and
    wherein the updated position data is received after requesting updated position data.

6. The method of claim 1,
    wherein the geofence parameters includes one or more stationary geofence parameters, and
    wherein determining the distance between the updated position of the mobile target and the monitored position of the client device occurs in response to determining that the monitored position transgresses the one or more stationary geofence parameters.

7. The method of claim 1, wherein the first threshold distance is a user-predetermined setting.

8. The method of claim 1,
    wherein the geofence parameters further include a stationary geographic border; and wherein determining that the monitored position transgresses the geofence parameters further includes determining that the monitored position transgresses the stationary geographic border.

9. The method of claim 8,
    wherein the method further comprises, in response to determining that the monitored position transgresses the stationary geographic border, requesting updated position data associated with the mobile target; and
    wherein the updated position data is received after requesting updated position data.

10. At least one non-transitory processor readable storage medium storing a computer program of instructions configured to be readable by at least one processor for instructing the at least one processor to execute a computer process for performing the method as recited in claim 1.

11. The method of claim 1, wherein the determination of transgression is further based on an operating mode of the client device.

12. The method of claim 11, wherein the operating mode of the client device comprises at least one of a battery charge level, a "hand-free" mode or an "airplane" mode.

13. An article of manufacture comprising:
    at least one non-transitory processor readable storage medium; and instructions stored on the at least one medium;
    wherein the instructions are configured to be readable from the at least one medium by at least one processor and thereby cause the at least one processor to operate so as to:
        receive geofence parameters comprising at least one target, wherein the at least one target includes a mobile target;

receive updated position data associated with the mobile target and update the position of the mobile target in response to the updated position data;

monitor a position of a client device, the client device being separate from the mobile target; and determine that the monitored position of the client device transgresses the geofence parameters associated with the mobile target, wherein the monitored position of the client device is based on a range of imprecise locations, wherein the determination includes determining that a distance between the updated position of the mobile target and the monitored position of the client device is greater than a first threshold distance, wherein the determination of transgression is based on a probability distribution of the position of the client device based on a reported error and a previous position of the client device.

14. The article of claim 13, the at least one processor further operable to generate a notification in response to determining that the monitored position transgresses the geofence parameters.

15. The article of claim 13,
wherein the at least one target is a plurality of targets, the plurality of targets further including a stationary geographic position; and
wherein determining that the monitored position transgresses the geofence parameters further includes determining that a distance between the stationary geographic position and the monitored position is greater than a second threshold distance.

16. The article of claim 15,
wherein the at least one processor is further operable to, in response to determining that the distance between the stationary geographic position and the monitored position is greater than a second threshold distance, request updated position data associated with the mobile target; and
wherein the updated position data is received after requesting updated position data.

17. The article of claim 13,
wherein the geofence parameters includes one or more stationary geofence parameters, and
wherein determining the distance between the updated position of the mobile target and the monitored position of the client device occurs in response to determining that the monitored position transgresses the one or more stationary geofence parameters.

18. A system comprising:
one or more processors communicatively coupled to a network; wherein the one or more processors are configured to:

receive geofence parameters comprising at least one target, wherein the at least one target includes a mobile target;

receive updated position data associated with the mobile target and update the position of the mobile target in response to the updated position data;

monitor a position of a client device, the client device being separate from the mobile target; and determine that the monitored position of the client device transgresses the geofence parameters associated with the mobile target, wherein the monitored position of the client device is based on a range of imprecise locations, wherein the determination includes determining that a distance between the updated position of the mobile target and the monitored position of the client device is greater than a first threshold distance, wherein the determination of transgression is based on a probability distribution of the position of the client device based on a reported error and a previous position of the client device.

19. The system of claim 18, the one or more processors are further configured to generate a notification in response to determining that the monitored position transgresses the geofence parameters.

20. The system of claim 18,
wherein the at least one target is a plurality of targets, the plurality of targets further including a stationary geographic position; and
wherein determining that the monitored position transgresses the geofence parameters further includes determining that a distance between the stationary geographic position and the monitored position is greater than a second threshold distance.

21. The system of claim 20,
wherein the one or more processors are further configured to, in response to determining that the distance between the stationary geographic position and the monitored position is greater than a second threshold distance, request updated position data associated with the mobile target; and
wherein the updated position data is received after requesting updated position data.

22. The system of claim 18,
wherein the geofence parameters includes one or more stationary geofence parameters, and
wherein determining the distance between the updated position of the mobile target and the monitored position of the client device occurs in response to determining that the monitored position transgresses the one or more stationary geofence parameters.

* * * * *